Nov. 11, 1969  W. PILLICH  3,477,590
METAL STRUCTURE TENSIONING SYSTEM FOR CRANE DEVICES
AND ROPE ARRANGEMENT THEREFOR
Filed Nov. 22, 1967  3 Sheets-Sheet 1

United States Patent Office 3,477,590
Patented Nov. 11, 1969

3,477,590
METAL STRUCTURE TENSIONING SYSTEM FOR CRANE DEVICES AND ROPE ARRANGEMENT THEREFOR
Wojciech Pillich, ul. Spichrzowa 1, Zabrze, Poland
Filed Nov. 22, 1967, Ser. No. 685,051
Claims priority, application Poland, Dec. 2, 1966, P 117,778
Int. Cl. B66c 23/02, 17/06, 23/62
U.S. Cl. 212—63                   3 Claims

ABSTRACT OF THE DISCLOSURE

A method of tensioning metal structures of crane equipment loaded statically and dynamically, consisting in the use of the weight of the displaced load in order to produce tensioning forces in a system of tension members, or a "self-tensioning of the supporting structure." The tension member system for effecting this method comprises an assembly of tension members running through a system of pulleys and pulley blocks, where the reversible pulleys are protected from swinging by means of a guide, which at the same time permits a linear shift of the reversible pulley as the tension members undergo elongation. The assembly is fitted to the supporting structure in order to displace the underslung load.

BACKGROUND OF THE INVENTION

An object of the invention is to provide a method of tensioning a metallic structure of crane equipment, and the essential feature of the method according to the invention is the utilization of the displaced load weight to produce tensioning forces, or "self-tensioning" of the structure.

After applying the load to the device, a part of its load—dependent on the constructional design of the tensioning system—is suspended by a guiding member. This member guided with steering pulleys transmits the force therein to the tension member system, connected with supporting members of the crane device.

The tensioning system is composed of pulley blocks and tension members or is a lever train with tension members connecting the levers. The required magnitude and position of the tensioning force and the tensioning moment correlated with it is obtained through choosing the pulley blocks or the lever train of suitable transmission ratio and situated suitably on the supporting structure. The produced tensioning force is directly proportional to the weight of the displaced load and it occurs exclusively within the period of subjecting the crane device with a load.

The hitherto known methods of tensioning of the metal structure consist in the tensioning, among others, by means of high resistant tension members connected with the basic structure by anchor members. These methods adapted to the tensioning of the structure loaded mainly statically, show many faults when the structure is loaded dynamically, as is the case for carrying structures of crane devices.

The existing methods require an application of suitable devices to produce the tensioning forces and to control them, and they make difficult the assembling of the structure, require a continuous checking of the tensile forces acting in the tension members, which not only increases the maintenance expenses, but also poses the danger of loss of the stability of the unloaded structure, and requires many time-consuming calculations and computations (as the structures are of statically indeterminate construction).

SUMMARY OF THE INVENTION

The purpose of the invention is to provide a method of tensioning of the metal structure of the crane equipment make possible utilizing the weight of the displaced load in order to produce tensioning forces or "self-tensioning" of the structure. This purpose is achieved by designing a suitable system of tension members or of a lever train with interconnecting tension members of a suitable transmission ratio and location on the carrying member, whereby the required magnitude and position of the tensioning force and of the tensioning moment are correlated with the load. The produced tensioning force is directly proportional to the weight of the load being displaced and it occurs exclusively within the period of applying load to the device.

By means of the new method, more economical dimensioning of the structure and reduction of execution and maintenance costs are achieved, and in particular the method allows: to utilize better and to reduce the consumption of metal for the carrying structure, to decrease the construction costs by eliminating the tensioning devices and instruments controlling the tensioning forces, as well as complicated anchor members, decrease of assembly costs caused by the realization of the tensioning and control of tensions and elongations of the tension members, to reduce the work time expended for the maintenance in course of the exploitation of the equipment, to avoid effects of the influence of relaxation and steel creep of the tension members, to avoid losses caused by the skid and tensioning inaccuracies of the tensioning and anchor devices, to preserve the invariability of the tensioning force, suitable for the weight of the displaced load, to avoid the tensioning of an unloaded structure, to increase the hoisting capacity of the existing equipment without expensive modifications, and to diminish the extensive computations by rendering the construction with the tensioning system statically determinate.

BRIEF DESCRIPTION OF THE DRAWING

By way of example, a deivce for effecting the method of tensioning of the metal structure of crane equipment is illustrated in the accompanying drawing, in which.

DESCRIPTION OF THE PREFERRED EMBODIMENT

Figure 1:
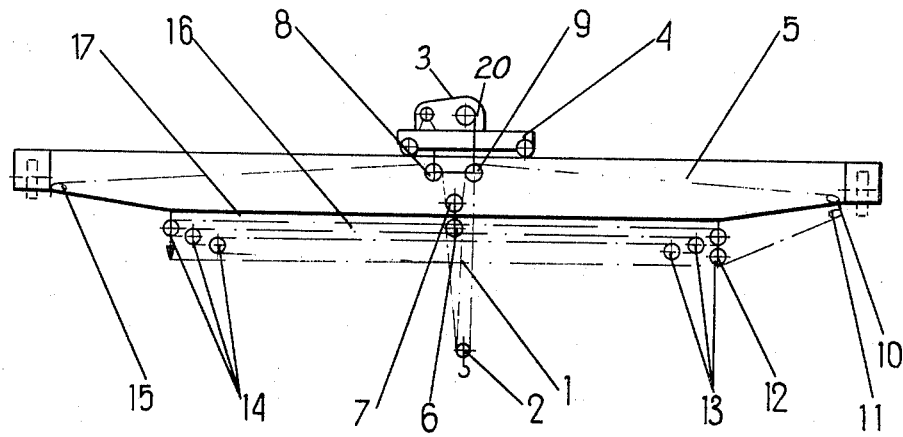
FIG. 1 is a side elevation view of the crane and of the tensioning system.
Figure 2:
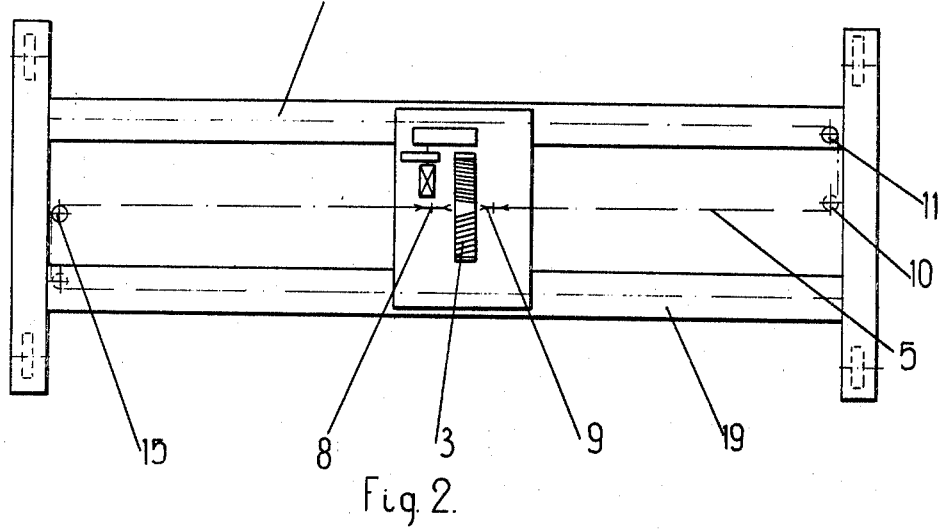
FIG. 2 is the top view of the crane.
Figures 3, 4:
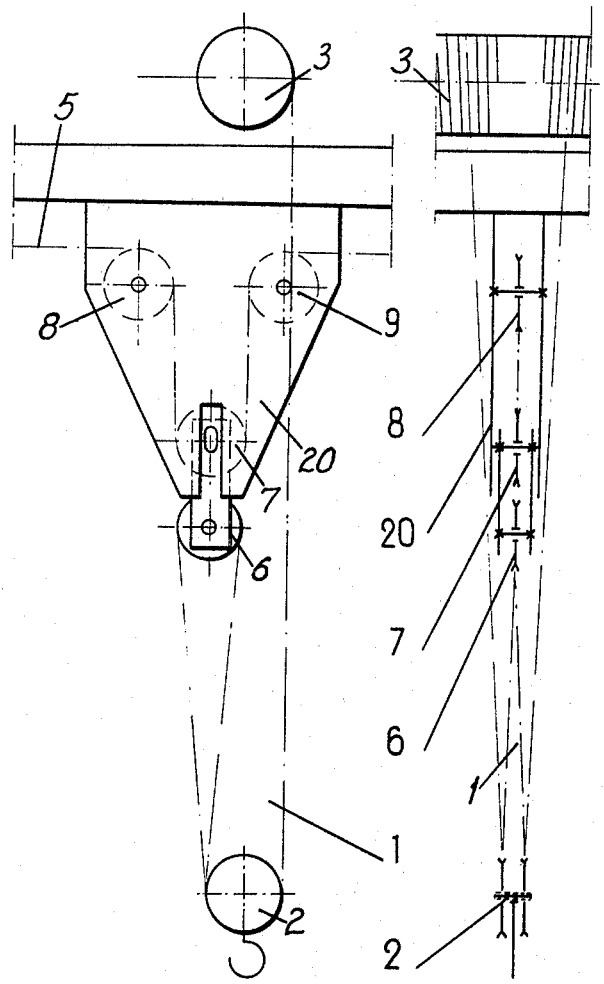
FIG. 3 is a side view on enlarged scale of the pulley suspension.
FIG. 4 is an end view of the pulley suspension of FIG. 3 turned by 90° in relation to the FIG. 3.

As shown in FIGS. 2 and 3, a load is capable of being underslung on a hook of compound pulley 2 which is supported by rope 1, two sides of which are reeled on the drum 3 of a lifting mechanism installed on the crab 4 of the crane, and other two sides are hung over the compensating pulley 6. The compensating pulley 6 is suspended beneath reversible pulley 7 which in turn is supported on the tension member 5 which through a system of guiding pulleys 9; 10; 11; 12 and pulley blocks 13; 14, and tension members 5; 16; 17 produces an axial load on the girder 18 of the crane. In a similar way, the tension member 5, running over the guiding pulleys 8; 15 produces an axial load on the second girder 19 of the crane. It is to understood that the stress produced in the girders 18 and 19 by the generated axial loads, is in opposition to the stress produced in the girders in resisting the weight of the load. In FIGS. 3 and 4 is shown a detail of the suspension of the compensating pulley 6, suspension of the reversible pulley 7 on the tension member 5; and the layout of the tension member 5 over the guiding pulleys 8; 9. The reversible pulley 7 is restricted from swinging by means of the guide 20 utilized simultaneously to mount the guiding pulleys 8; 9 therein. The guide 20 permits linear movement of the reversible pulley 7 as results of changes of length of member 5; 16; 17 caused by application of the load on the crane.

Figure 5:
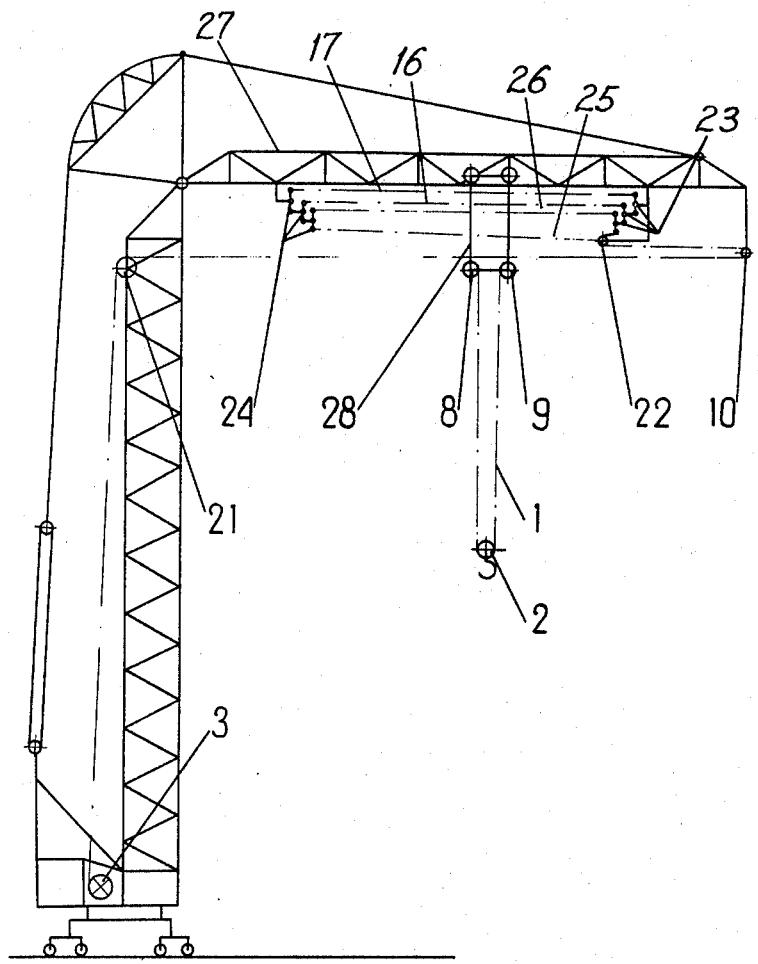
FIG. 5 is a side elevation view of a crane jib with a travelling crab utilizing the tensioning system according to the invention.

The modification of the tensioning arrangement, shown in FIG. 5, consists in the application of the lever train 23; 24 instead of pulley blocks 13; 14, and adaptation of the method to the tensioning of the metal structure of crane jib 27 with travelling crab 28. The rope 1 wrapped through the compound pulley 2 is passed in one direction by the guiding pulleys 8; 21 and is fixed to the drum 3 of the hoisting station at one end, the rope 1 is passed in the opposite direction over the guiding pulleys 9; 10; 22 and its other end is fastened to the structure of the crane jib 27. After applying load to the compound pulley 2, the force acting in the rope 1 produces forces in the tensioning members 16; 17; 25; 26 which in turn causes tensioning of the structure of the crane jib 27 through a suitable lever train 23; 24.

What is claimed is:

1. In combination, a crane including an arm structure, first means carried by the arm structure for receiving a load to be supported by the crane, and second means coupled between said first means and said arm structure for applying axial load to the arm structure in consequence of the weight of the load and in proportion thereto, the axial load being located and directed on said arm structure to subject the arm structure to a stress in opposition to that of the applied load, said second means comprising a system of pulleys supported from the arm structure, and a tension member engaged with said pulleys and subjected to a portion of the load applied to the crane, one of said pulleys reversing the direction of the tension member, and guide means supporting said one pulley for linear displacement to compensate for axial deformation of the arm structure and of said tension member while simultaneously preventing swinging movement of said one pulley.

2. In combination, a crane including an arm structure, first means carried by the arm structure for receiving a load to be supported by the crane, and second means coupled between said first means and said arm structure for applying axial load to the arm structure in consequence of the weight of the load and in proportion thereto, the axial load being located and directed on said arm structure to subject the arm structure to a stress in opposition to that of the applied load, said second means comprising a system of pulleys supported from the arm structure, and a tension member engaged with said pulleys and subjected to a portion of the load applied to the crane, said system comprising a lever train coupled to the arm structure and supporting said pulleys.

3. The combination as claimed in claim 1, wherein said system of pulleys is suspended beneath the arm structure and the load on the crane is applied vertically downwards.

References Cited
UNITED STATES PATENTS

| 3,207,399 | 9/1965 | Bevard | 212—11 |
| 3,344,933 | 10/1967 | Jelatis | 212—24 |
| 3,402,824 | 9/1968 | Zweifel | 212—17 |

HARVEY C. HORNSBY, Primary Examiner

U.S. Cl. X.R.

212—11, 144